(12) United States Patent
Katano

(10) Patent No.: US 8,211,581 B2
(45) Date of Patent: Jul. 3, 2012

(54) CONTROL APPARATUS AND CONTROL METHOD FOR FUEL CELL

(75) Inventor: Koji Katano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 955 days.

(21) Appl. No.: 10/591,036

(22) PCT Filed: Apr. 12, 2005

(86) PCT No.: PCT/IB2005/000958
§ 371 (c)(1), (2), (4) Date: Aug. 29, 2006

(87) PCT Pub. No.: WO2005/101543
PCT Pub. Date: Oct. 27, 2005

(65) Prior Publication Data
US 2007/0184318 A1    Aug. 9, 2007

(30) Foreign Application Priority Data
Apr. 13, 2004  (JP) ................. 2004-117793

(51) Int. Cl.
*H01M 8/04* (2006.01)

(52) U.S. Cl. ........ 429/446; 429/428; 429/443; 429/444; 429/448; 429/449

(58) Field of Classification Search .................. None
See application file for complete search history.

(56) References Cited

U.S. PATENT DOCUMENTS

| | | | |
|---|---|---|---|
| 6,558,827 B1 | 5/2003 | Reiser | |
| 6,632,552 B2 * | 10/2003 | Yamanashi | 429/17 |
| 6,638,652 B1 * | 10/2003 | Motozono et al. | 429/423 |
| 6,667,128 B2 * | 12/2003 | Edlund | 429/46 |
| 7,371,477 B2 * | 5/2008 | Yamamoto et al. | 429/17 |
| 2003/0027024 A1 * | 2/2003 | Ilo et al. | 429/19 |
| 2003/0157383 A1 * | 8/2003 | Takahashi | 429/13 |

(Continued)

FOREIGN PATENT DOCUMENTS

DE    43 22 765 C1    6/1994

(Continued)

OTHER PUBLICATIONS

Aug. 16, 2011 German Office Action in corresponding Application No. DE 11 2005 000 827.4 w/translation.

*Primary Examiner* — Cynthia Lee

(74) *Attorney, Agent, or Firm* — Oliff & Berridge, PLC

(57) ABSTRACT

A control apparatus for a fuel cell, including oxidizing gas supplying means for supplying oxidizing gas to a cathode via an oxidizing gas supply line; cathode-side gas pressure detecting means for detecting a gas pressure within the oxidizing gas supply line or the cathode; hydrogen supplying means for supplying hydrogen to an anode via a hydrogen supply line; target hydrogen partial pressure determining means for determining a hydrogen pressure among a gas pressure within the hydrogen supply line or the anode; hydrogen supply pressure calculating means for calculating a hydrogen supply pressure of hydrogen to be supplied to the fuel cell, based upon the target hydrogen partial pressure and the gas pressure detected by the cathode-side gas pressure detecting means; and hydrogen supply control means for supplying hydrogen from the hydrogen supplying means to the fuel cell at the hydrogen supply pressure, and the method thereof.

3 Claims, 7 Drawing Sheets

U.S. PATENT DOCUMENTS

2004/0214059 A1  10/2004  Enjoji et al.

FOREIGN PATENT DOCUMENTS

| DE | 44 26 272 A1 | 1/1996 |
| EP | 1 339 125 A2 | 8/2003 |
| JP | A-06-260199 | 9/1994 |
| JP | A 7-169488 | 7/1995 |
| JP | A 9-259913 | 10/1997 |
| JP | A 2002-353837 | 12/2002 |
| JP | A 2003-331889 | 11/2003 |

\* cited by examiner

CONTROL APPARATUS AND CONTROL METHOD FOR FUEL CELL

INCORPORATION BY REFERENCE

The disclosure of Japanese Patent Application No. 2004-117793 filed on Apr. 13, 2004, including the specification, drawings and abstract is incorporated herein by reference in its entirety.

BACKGROUND OF THE INVENTION

1. Field of the Invention

The invention relates to a control apparatus and control method for a fuel cell.

2. Description of the Related Art

A polymer electrolyte fuel cell has an electrolyte membrane, two catalyst layers formed by sandwiching the electrolyte membrane therebetween, and a pair of diffusion layers formed on outer sides of the two catalyst layers. One diffusion layer in the fuel cell is supplied with a fuel gas including hydrogen, and the other diffusion layer is supplied with an oxidizing gas including oxygen. The diffusion layer to which the fuel gas is supplied is called a hydrogen electrode, or an anode; the diffusion layer to which the oxidized gas is supplied is called an air electrode, or a cathode.

Hydrogen supplied to the hydrogen electrode diffuses to the catalyst layer, and separates protons and electrons in the catalyst layer. Separated protons then pass through the electrolyte membrane along with water molecules and move to the catalyst layer on the positive electrode side.

On the contrary, oxygen supplied to the air electrode diffuses to the catalyst layer on the air electrode side, and water is generated through a reaction among protons, electrons, and oxygen. By connecting the air electrode and the hydrogen electrode to an external circuit (i.e., a conductor), electrons move from the hydrogen electrode to the positive air electrode, and are expended in reactions with the above protons.

To increase the amount of electricity generated in the fuel cell, an amount of oxidizing gas and fuel gas corresponding to the amount of electricity to be generated must be supplied to the air electrode and the hydrogen electrode, respectively. In general, air is used for oxidizing gas.

However, air includes oxygen and nitrogen. Since nitrogen is not used in the reaction on the air electrode side, in addition to accumulating in space on the air electrode side, the nitrogen also diffuses to the diffusion layer and electrolyte membrane, and ultimately passes to the hydrogen electrode side. Water generated on the air electrode side due to the reaction among protons, electrons, and oxygen also diffuses to the diffusion layer and electrolyte membrane, and ultimately passes to the hydrogen electrode side. Therefore, operating the fuel cell for extended periods of time increases the concentration of impurities, such as water vapor and nitrogen, unlike hydrogen in space on the hydrogen electrode side of the fuel cell. Patent documents related to a control apparatus for a fuel cell include Japanese Patent Laid-Open Publication No. 2002-353837, Japanese Patent Laid-Open Publication No. 7-169488, Japanese Patent Laid-Open Publication No. 2003-331889, and Japanese Patent Laid-Open Publication No. 9-259913.

An increase in the concentration of impurities other than hydrogen on the hydrogen electrode side impedes an increase in hydrogen concentration, which in turn impedes an increase in the amount of electricity generated. For this reason, a conventional polymer electrolyte fuel cell has been provided with an exhaust valve on a downstream side of a fuel gas passage of the hydrogen electrode, in order to discharge post-reaction fuel gas (hereinafter referred to as "fuel off-gas") on the hydrogen electrode side.

Such an exhaust valve (as described, for example, in Japanese Patent Laid-Open Publication No. 2002-353837) opens when the fuel cell is activated, and is used to discharge impurity gas on the hydrogen electrode side, leading to an increase in the hydrogen concentration on the hydrogen electrode side.

After activation of the fuel cell, the exhaust valve is opened and closed according to a predetermined sequence to discharge impurities on the hydrogen electrode side and maintain a generated electricity amount.

However, the exhaust valve of a fuel cell system (where impurities are discharged to increase the hydrogen concentration by opening and closing the exhaust valve during activation) may freeze under a low temperature. Since time is required to defrost the frozen exhaust valve, the fuel cell cannot be activated in a short period of time. Furthermore, fuel efficiency is not always satisfactory in a fuel cell system where the exhaust valve is opened and closed during operation to maintain the generated electricity amount, because hydrogen may be discharged along with impurities.

SUMMARY OF THE INVENTION

In view of the foregoing points, it is an object of the invention to provide a control apparatus and a control method for a fuel cell which increase a generated electricity amount, and maintain a predetermined generated electricity amount, without depending on opening and closing of an exhaust valve on a hydrogen electrode side.

Thus, a control apparatus for a fuel cell is provided as an embodiment serving as an example of the invention, and includes: oxidizing gas supplying means for supplying an oxidizing gas to a cathode via an oxidizing gas supply line of the fuel cell, and hydrogen supplying means for supplying hydrogen to an anode via a hydrogen supply line of the fuel cell. Such a control apparatus is characterized by further including the following means, namely:

cathode-side gas pressure detecting means for detecting a gas pressure within at least one of the oxidizing gas supply line and the cathode;

target hydrogen partial pressure determining means for determining a target hydrogen partial pressure regarding a hydrogen pressure among a gas pressure within at least one of the hydrogen supply line and the anode;

hydrogen supply pressure calculating means for calculating a hydrogen supply pressure of hydrogen to be supplied to the fuel cell, based upon the target hydrogen partial pressure and the gas pressure detected by the cathode-side gas pressure detecting means; and hydrogen supply control means for controlling hydrogen so as to be supplied from the hydrogen supplying means to the fuel cell at the hydrogen supply pressure.

According to another aspect of the invention, a control apparatus for a fuel cell comprising an oxidizing gas supplying device for supplying an oxidizing gas to a cathode via an oxidizing gas supply line of the fuel cell, and a hydrogen supplying device for supplying hydrogen to an anode via a hydrogen supply line of the fuel cell is provided.

The control apparatus comprises:

a controller detects a gas pressure within at least one of the oxidizing gas supply line and the cathode, determines a target hydrogen partical pressure regarding a hydrogen pressure among a gas pressure within at least one of the hydrogen supply line and the anode, calculates a hydrogen supply pressure of hydrogen to be supplied to the fuel cell, based upon the target hydrogen partial pressure and the detected gas pressure, and controls hydrogen so as to be supplied from the hydrogen supplying device to the fuel cell at the hydrogen supply pressure.

According to a further aspect of the invention, a control method for a fuel cell is provided, and includes: oxidizing gas supplying means for supplying an oxidizing gas to a cathode via an oxidizing gas supply line of the fuel cell, and hydrogen supplying means for supplying hydrogen to an anode via a hydrogen supply line of the fuel cell. Such a control method is characterized by including the following steps, namely:

detecting a gas pressure within at least one of the oxidizing gas supply line and the cathode;

determining a target hydrogen partial pressure regarding a hydrogen pressure among a gas pressure within at least one of the hydrogen supply line and the anode;

calculating a hydrogen supply pressure of hydrogen to be supplied to the fuel cell, based upon the target hydrogen partial pressure and the detected gas pressure; and controlling hydrogen so as to be supplied from the hydrogen supplying means to the fuel cell at the hydrogen supply pressure.

According to the control apparatus and control method for a fuel cell as described above, gas pressure is detected within at least the cathode and the oxidizing gas supply line that supplies oxidizing gas to the fuel cell, and the hydrogen supply pressure is calculated based upon the gas pressure and the target hydrogen partial pressure. Hydrogen is then supplied to the anode at such a hydrogen supply pressure. It if is assumed that gas within the cathode and the oxidizing gas supply line leads to the anode side, then the hydrogen partial pressure on the anode side can then be controlled to the target hydrogen partial pressure by supplying hydrogen at the hydrogen supply pressure. In this case, the frequency with which an exhaust valve is used for discharging gas on the anode side can be decreased or the fuel cell can be controlled without using the exhaust valve, thereby relieving the need for providing such an exhaust valve.

The target hydrogen partial pressure here also preferably increases as the electricity generation amount required of the fuel cell increases.

By setting the target hydrogen partial pressure on the anode side higher according to an increase in the electricity generation amount required of the fuel cell, it is possible to calculate the hydrogen supply pressure according to the required electricity generation amount and generate electricity according to the required electricity generation amount.

Furthermore, preferably included are fuel cell temperature detecting means for detecting a temperature of the fuel cell, and correcting means for correcting a target hydrogen partial pressure based upon the temperature of the fuel cell, wherein the hydrogen supply pressure calculating means preferably calculate the hydrogen supply pressure of hydrogen to be supplied to the fuel cell based upon the corrected target hydrogen partial pressure and the gas pressure detected by the cathode-side gas pressure detecting means.

In addition, the control method preferably further includes the following steps, namely:

detecting a temperature of the fuel cell;

correcting the target hydrogen partial pressure based upon the temperature of the fuel cell; and calculating the hydrogen supply pressure of hydrogen to be supplied to the fuel cell based upon the corrected target hydrogen partial pressure and the detected gas pressure.

According to such a configured control apparatus and control method, the anode side can be controlled to a hydrogen partial pressure that is corrected based upon the temperature of the fuel cell, whereby an appropriate amount of hydrogen can be supplied according to the temperature and the generated electricity amount.

In addition, the target hydrogen partial pressure is also preferably set so as to decrease as the temperature of the fuel cell increases.

Since the degree of activation of the catalyst within the cell of the fuel cell differs depending on the temperature of the fuel cell, an appropriate generated electricity amount unaffected by the temperature can be obtained by setting the target hydrogen partial pressure lower as the temperature of the fuel cell increases.

Furthermore, preferably included are exhaust means for discharging residual gas remaining within at least one of the anode and the hydrogen supply line; exhaust control means for discharging the residual gas using the exhaust means when the hydrogen supply pressure is not within a tolerance range for gas pressure on the anode side; and residual gas partial pressure calculating means for calculating a partial pressure of residual gas remaining within at least one of the anode and the hydrogen supply line when residual gas is discharged, wherein the hydrogen supply pressure calculating means preferably calculate the hydrogen supply pressure of hydrogen to be supplied to the fuel cell based upon the target hydrogen partial pressure and the residual gas partial pressure.

In addition, the control method also preferably further includes the following steps, namely:

discharging residual gas when the hydrogen supply pressure is not within a tolerance range for gas pressure on the anode side;

calculating a partial pressure of residual gas remaining within at least one of the anode and the hydrogen supply line when residual gas is discharged; and calculating the hydrogen supply pressure of hydrogen to be supplied to the fuel cell based upon the target hydrogen partial pressure and the residual gas partial pressure.

According to such a configured control apparatus and control method, if the calculated hydrogen supply pressure is not within a tolerance range for gas pressure on the anode side, residual gas remaining within the anode and/or the hydrogen supply line can be discharged to reduce the gas pressure of the residual gas. Thus, the hydrogen supply pressure can be calculated based upon the reduced gas pressure of residual gas and the target hydrogen partial pressure. Accordingly, such a reduced gas pressure can be used to calculate the hydrogen supply pressure within a tolerance range for gas pressure on the anode side, whereby the fuel cell can be controlled within the tolerance range for gas pressure on the anode side.

According to the invention, it is possible to increase the generated electricity generation and/or maintain a predetermined generated electricity amount, without providing an exhaust valve on the hydrogen electrode side in the fuel cell and/or without depending on the opening and closing of an exhaust valve on the hydrogen electrode side.

BRIEF DESCRIPTION OF THE DRAWINGS

The above mentioned and other features, advantages, technical and industrial significance of this invention will be better understood by reading the following detailed description of preferred embodiments of the invention, when considered in connection with the accompanying drawings, wherein.

DETAILED DESCRIPTION OF THE PREFERRED EMBODIMENTS

In the following description and the accompanying drawings, the present invention will be described in more detail in terms of exemplary embodiments.

Figure 1:
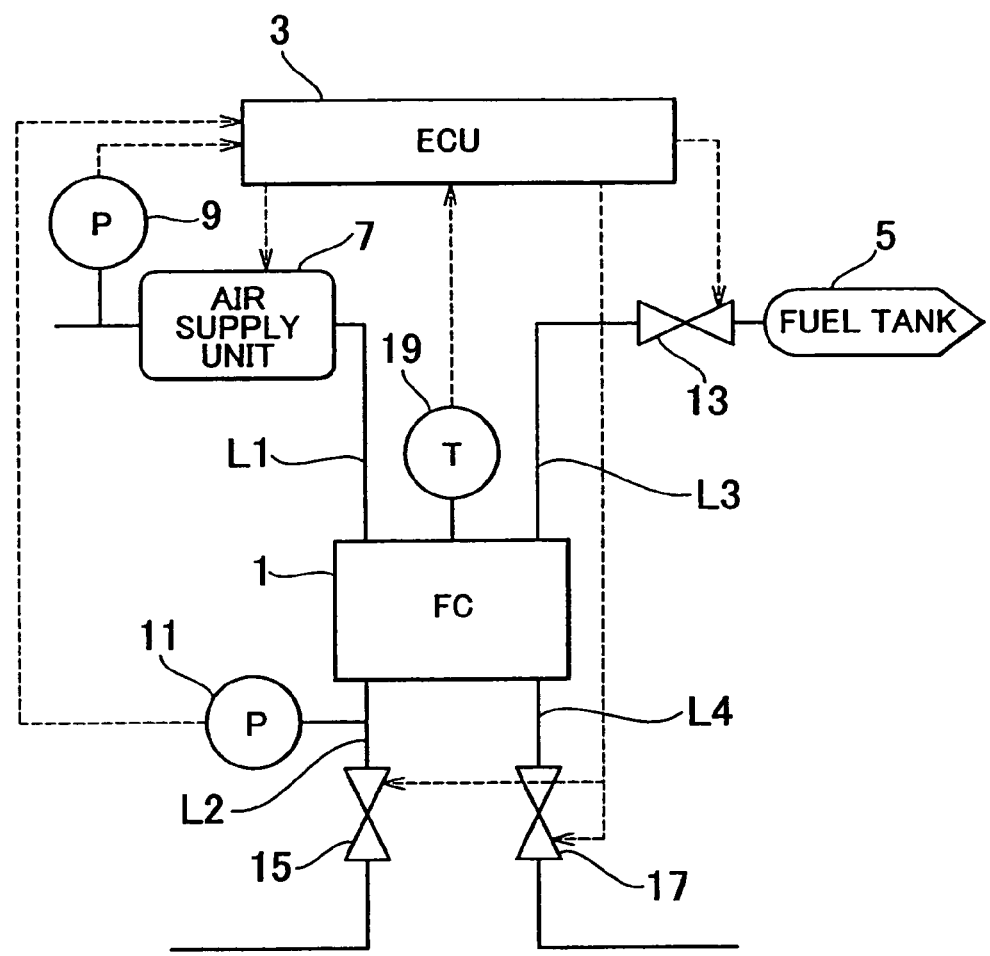
FIG. 1 is a schematic diagram of a fuel cell according to an embodiment of the invention.

FIG. 1 is a schematic diagram of a fuel cell according to an embodiment of the invention. The fuel cell includes the following: a fuel cell body 1; an air supply unit 7 for supplying air acting as an oxidizing gas to an air electrode (also called a cathode) of the fuel cell body 1; an atmospheric pressure sensor 9 disposed in an air induction passage upstream of the air supply unit 7; an air electrode pressure sensor 11 for measuring gas pressure on the air electrode side; a regulating valve 15 for regulating gas pressure on the air electrode side; a fuel tank 5 for supplying hydrogen acting as a fuel gas to a hydrogen electrode (also called an anode) of the fuel cell body 1; a hydrogen supply valve 13 for controlling a supply pressure of hydrogen from the fuel tank 5; an exhaust valve 17 for controlling a discharge of fuel off-gas from the hydrogen electrode; and a coolant temperature sensor 19 for detecting a temperature of coolant that cools the fuel cell body 1.

The fuel cell body 1 is structured from a laminated body (called a cell stack) in which multiple layers of cells that include a membrane-electrode assembly (MEA) and separator are connected in series and laminated. The MEA includes: a hydrogen electrode that separates hydrogen into protons and electrons; an electrolyte membrane that conducts protons generated by the hydrogen electrode to an air electrode; and an air electrode that generates water using oxygen, protons conducted to the air electrode, and electrons conducted from the hydrogen electrode via an external circuit.

Provided in the separator is an air passage for supplying air acting as an oxidizing gas to the air electrode within the cell. Air flows from upstream to downstream in the air passage within the cell, and diffuses in the direction of the membrane within the air electrode to react with protons within the air electrode. Accordingly, an oxygen concentration in the air passage within the cell gradually decreases from upstream to downstream.

The separator is also provided with a hydrogen passage for supplying hydrogen acting as a fuel gas to the hydrogen electrode within the cell. Hydrogen flows from upstream to downstream in the hydrogen passage within the cell, diffuses in the direction of the membrane within the hydrogen electrode, and is transformed into protons due to the action of a catalyst within the hydrogen electrode. The protons then pass through the membrane and move toward the air electrode. Accordingly, a hydrogen concentration in the hydrogen passage within the cell gradually decreases from upstream to downstream.

The air supply unit 7 (corresponding to oxidizing gas supplying means) is, for example, an air compressor. Air in the atmosphere is pressurized by the air supply unit 7, and then supplied to the air electrode of the fuel cell body 1 via an air supply line L1 (the above air passage within the cell). The flow rate of air supplied to the air supply line L1 from the air supply unit 7 is controlled by a control signal from an ECU 3. Atmospheric pressure is measured by the atmospheric pressure sensor 9, which is provided in the air induction passage upstream of the air supply unit 7.

On a downstream side of the air electrode of the fuel cell body 1, a gas exhaust line L2 is connected to an outlet of the air passage, and the regulating valve 15 is provided in the gas exhaust line L2. The discharge of gas on the air electrode side is controlled by the regulating valve 15. Moreover, the air electrode pressure sensor 11 (corresponding to cathode-side gas pressure detecting means) for measuring gas pressure on the air electrode side is provided in the gas exhaust line L2. In addition to being supplied with air from the air supply unit 7, the air electrode of the fuel cell body 1 is controlled to a predetermined gas pressure by the regulating valve 15. Note that the air supply line L1 on the outlet side of the air supply unit 7, the air electrode of the fuel cell body 1 (the air passage within the cell), and a space up to the regulating valve 15 in the gas exhaust line L2 correspond to an oxidizing gas supply passage of the invention.

The fuel tank 5 (corresponding to hydrogen supplying means) supplies hydrogen to the hydrogen electrode side of the fuel cell body 1 (the above hydrogen passage within the cell) via the hydrogen supply valve 13 upstream of a hydrogen supply line L3. The fuel tank 5 maintains hydrogen in a high-pressure state (a pressure state exceeding 1 atmosphere).

The hydrogen supply valve 13 (corresponding to hydrogen supply control means) regulates a flow rate of gas passing therethrough by controlling an opening and closing operation of the valve. Here, the opening and closing operation of the valve includes, for example, an open valve cycle, an open valve period, and a closed valve period. However, the hydrogen supply valve 13 may also control the supply of fuel gas by changing an opening angle of an opening portion thereof through valve movement.

On a downstream side of the hydrogen electrode of the fuel cell body 1, a gas exhaust line L4 is connected to the hydrogen supply passage within the cell, and the exhaust valve 17 (corresponding to exhaust means) is provided in the gas exhaust line L4. The exhaust valve 17 also regulates a flow rate of gas passing therethrough by controlling an opening and closing operation of the valve. However, the exhaust valve 17 may also control the flow rate of exhaust gas by changing an opening angle of an opening portion thereof through valve movement.

Prior to the supply of hydrogen (i.e., before the fuel cell is activated), air permeating through the MEA (mainly nitrogen) and generated water created by the air electrode (water vapor or droplets) are predominant on the hydrogen electrode side. Hereinafter, such nitrogen, water vapor and the like will be referred to as impurity gas. The fuel cell according to the embodiment assume s that the gas pressure of impurity gas on the hydrogen electrode side, prior to the supply of hydrogen, is substantially equivalent to the gas pressure on the air electrode side in order to determine the supply pressure of hydrogen to be supplied from the hydrogen supply valve 13.

Here, the hydrogen supply pressure is defined as the pressure of hydrogen supplied by the hydrogen supply valve 13 to the hydrogen supply line L3, which is connected to the hydrogen electrode and the interior of the hydrogen electrode. The interior of the hydrogen electrode is filled with gas consisting of hydrogen supply pressure and a balancing pressure (mixed gas of hydrogen and impurity gas). For example, a case can be considered in which the fuel tank 5 is filled with 50 atmospheres of hydrogen, which the hydrogen supply valve 13 decompresses to 2 atmospheres and supplies to the hydrogen supply line L3. Here, it is assumed that the gas pressure of impurity gas prior to the supply of hydrogen has become 1 atmosphere. In this case, hydrogen is supplied with a hydrogen supply pressure of 2 atmospheres, such that the interior of the hydrogen electrode becomes filled with 2 atmospheres of mixed gas. Moreover, the partial pressures of the impurity gas and hydrogen are both 1 atmosphere.

Furthermore, the fuel cell according to the embodiment assumes that the gas pressure (overall pressure) on the hydrogen electrode side consists of the partial pressure of hydrogen present on the hydrogen electrode side and the gas pressure of the air electrode side, in order to control the supply pressure of hydrogen during operation of the fuel cell. Also note that the hydrogen supply line L3 on the outlet side of the hydrogen supply valve 13, the hydrogen electrode of the fuel cell body 1 (the hydrogen passage within the cell), and a space up to the exhaust valve 17 in the gas exhaust line L4 correspond to a hydrogen supply passage of the invention.

The coolant temperature sensor 19 measures a temperature of coolant that cools the cell stack within the fuel cell body 1.

The ECU 3 controls the reaction of the fuel cell according to the embodiment, and includes a CPU, a memory, and an input/output interface. The ECU 3 also controls the opening and closing, or the opening angles for opening portions, of the hydrogen supply valve 13, the air regulating valve 15, and the exhaust valve 17 via the input/output interface (not shown). In addition, the ECU 3 controls the flow rate of air supplied from the air supply unit 7. Furthermore, the ECU 3 is connected to the atmospheric sensor 9, the air electrode pressure sensor 11, and the coolant temperature sensor 19 (corresponding to fuel cell temperature detecting means), thereby monitoring the atmospheric pressure, the gas pressure within the air electrode, and the temperature of coolant.

During activation of the fuel cell, the ECU 3 refers to a target hydrogen partial pressure for stable electricity generation in a predetermined storage area of the memory (the ECU 3 executing such processing corresponds to means for determining the target hydrogen partial pressure). The target hydrogen partial pressure for stable electricity generation is a partial pressure of hydrogen required by the fuel cell to sustain stable electricity generation. Also note that the target hydrogen partial pressure for stable electricity generation is determined in advance as an actual value or a design value from fuel cell specifications, dimensions or the like, and is retained in the memory of the ECU 3.

In the fuel cell, the ECU 3 sets the air electrode pressure during activation to the atmospheric pressure. Furthermore, the ECU 3 calculates the target hydrogen pressure from the gas pressure on the air electrode side and the above target hydrogen partial pressure for stable electricity generation. The ECU 3 in the embodiment assumes that the gas pressure in the air electrode is substantially the pressure of the impurity gas on the hydrogen electrode side prior to the supply of hydrogen. The target hydrogen pressure is then calculated from a pressure that is the sum of gas pressure in the air electrode and the target hydrogen partial pressure for stable electricity generation (the ECU 3 executing such processing corresponds to hydrogen supply pressure calculating means).

The ECU 3 controls opening and closing of the hydrogen supply valve 13, and controls the supply pressure of hydrogen supplied to the hydrogen electrode side to the target hydrogen pressure. Consequently, hydrogen whose partial pressure excludes the pressure of impurity gas on the hydrogen electrode side from the target hydrogen pressure, i.e., hydrogen whose pressure is the target hydrogen partial pressure for stable electricity generation, is supplied to the hydrogen electrode. Thus, in the fuel cell according to the embodiment, hydrogen acting as a fuel gas is mainly supplied to the hydrogen electrode through control of the hydrogen supply pressure during the supply of hydrogen, and the exhaust valve 17 is opened and closed as little as possible.

After activation of the fuel cell, the ECU 3 refers to a map indicating the relation between a required electricity generation amount and the target hydrogen partial pressure for a hydrogen partial pressure corresponding to the required electricity generation amount (the ECU 3 executing such processing corresponds to means for determining the target hydrogen partial pressure).

Figure 2:
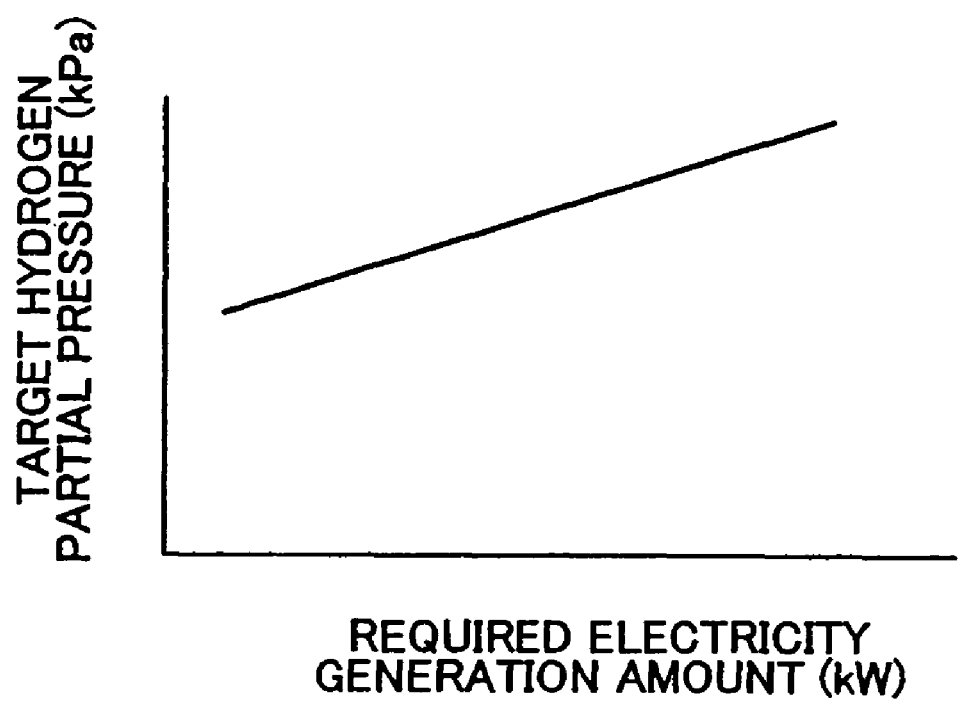
FIG. 2 is a conceptual diagram of a map in which a target hydrogen partial pressure is calculated.

FIG. 2 is a conceptual diagram of a map in which a target hydrogen partial pressure is calculated. When a required electricity generation amount is designated, the ECU 3 uses this map for calculation of the hydrogen partial pressure required to generate such an amount of electricity. In the map of FIG. 2, the x-axis represents the required electricity generation amount, and the y-axis represents the target hydrogen partial pressure required for achieving the required electricity generation amount (in units of kPa, for example). For a mixed gas including a plurality of gases, the concentration of each gas is set substantially corresponding to the partial pressure of each gas.

The map mentioned above can be set for each fuel cell specification (for example, catalyst density, cell stack quantity, electrode material and the like) using actual measurements. As shown in FIG. 2, the map indicating the relation between the required electricity generation amount and the target hydrogen partial pressure generally slopes upward, i.e., the map is a graph in which the target hydrogen partial pressure increases in conjunction with increases in the required electricity generator amount. Such a map is retained in the memory of the ECU 3 as a table formed from multiple combinations of required electricity generation values and target hydrogen partial pressure values. However, the ECU 3 may also retain an empirically based relation between the required electricity generation value and the target hydrogen partial pressure value (for example, a first-order line, or a curve of degree two or higher). It should be noted that a map for calculating the gas pressure of the air electrode and a map for calculating the amount of air supplied to the air electrode have similar structures.

In addition, the ECU 3 refers to a map indicating the relation between the required electricity generation amount and an oxygen supply amount for an oxygen supply amount corresponding to the required electricity generation amount. Oxygen for the oxygen supply amount is supplied by the ECU 3 using air from the air supply unit 7 (the ECU 3 executing such processing corresponds to oxidizing gas amount control means). Furthermore, the ECU 3 refers to a map indicating the relation between the required electricity generation amount and the gas pressure of the air electrode for the gas pressure corresponding to the required electricity generation amount. By opening and closing the regulating valve 15, the ECU 3 controls the gas pressure of the air electrode.

The ECU 3 further assumes that the gas pressure of the air electrode is substantially the pressure of impurity gas on the hydrogen electrode side, and determines the target hydrogen pressure from the gas pressure of the air electrode and the target hydrogen partial pressure (the ECU 3 executing such processing corresponds to hydrogen supply pressure calculating means). The ECU 3 controls opening and closing of the hydrogen supply valve 13, and controls the supply pressure of hydrogen supplied to the hydrogen electrode interior to the target hydrogen pressure. Thus, in the fuel cell according to the embodiment, hydrogen acting as a fuel gas is mainly supplied to the hydrogen electrode through control of the hydrogen supply pressure after activation of the fuel cell as well, and the exhaust valve 17 is opened and closed as little as possible.

Figure 3:
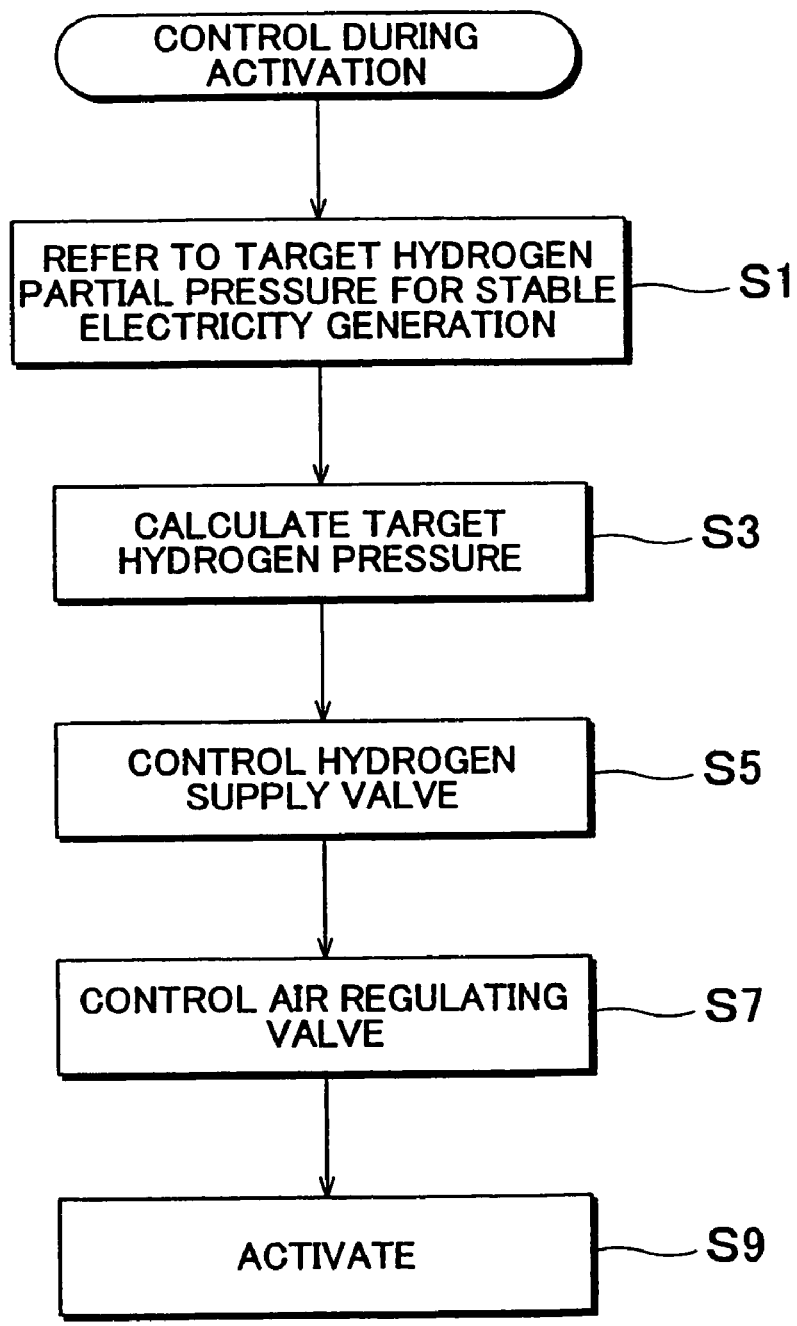
FIG. 3 is a flowchart illustrating a control of an ECU 3 during activation of the fuel cell.

FIG. 3 is a flowchart illustrating a control of the ECU 3 during activation of the fuel cell. The processing can be achieved as a control program executed by the CPU of the ECU 3. During activation of the fuel cell, the ECU 3 first refers to the target hydrogen partial pressure for stable electricity generation (S1). Next, the ECU 3 assumes that the pressure of the air electrode and the pressure of the hydrogen electrode prior to the supply of hydrogen are at the atmospheric pressure, and calculates the target hydrogen pressure from the atmospheric pressure and the target hydrogen partial pressure for stable electricity generation (S3). Here, the target hydrogen pressure is set as the sum of the atmospheric pressure and the target hydrogen partial pressure for stable electricity generation.

The ECU 3 subsequently controls the hydrogen supply valve 13 to supply hydrogen of the target hydrogen pressure to the hydrogen electrode (S5). Next, the ECU 3 controls the air regulating valve 15, and sets the air electrode to the atmospheric pressure. Such control results in the hydrogen partial pressure on the hydrogen electrode side being controlled to the target hydrogen partial pressure for stable e electricity generation. The fuel cell is then activated by the ECU 3 (S9).

It should be noted here that the air electrode is controlled so as to attain the atmospheric pressure during activation. However, the embodiment of the invention is not limited to such a procedure, that is, the procedure itself for setting the air electrode to the atmospheric pressure during activation is not mandatory.

Figure 4:
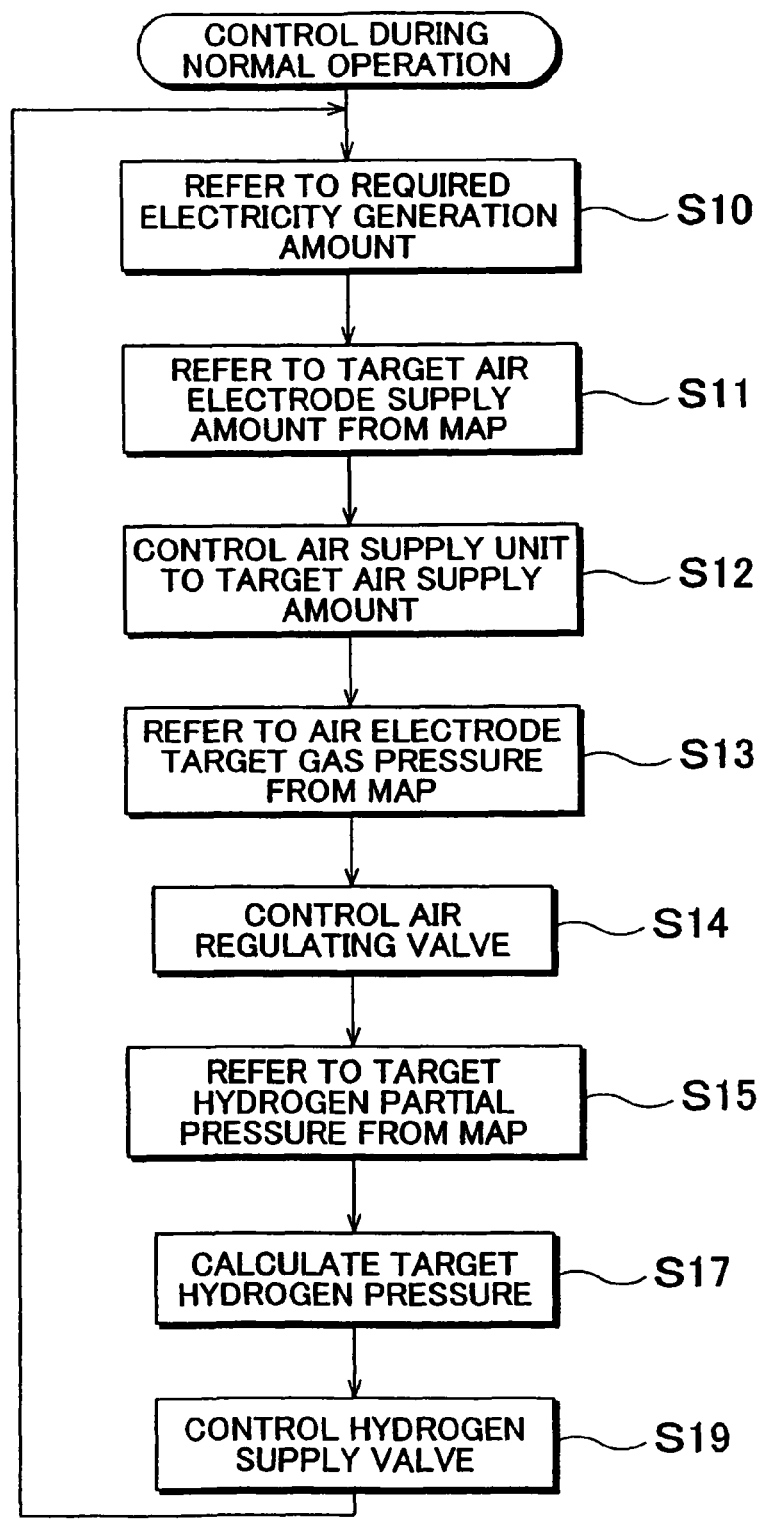
FIG. 4 is a flowchart illustrating a control of the ECU 3 during normal operation.

FIG. 4 is a flowchart illustrating a control of the ECU 3 during normal operation. Such processing can also be achieved as a control program executed by the CPU of the ECU 3. During a normal operation state, the ECU 3 first calculates the required electricity generation amount (S10). The required electricity generation amount can be calculated based upon information including a user instruction, such as an acceleration instruction value corresponding to an accelerator operation of a vehicle, or a history of electricity usage for a household, facility, apparatus or the like to which electricity is supplied from the fuel cell.

The ECU 3 subsequently refers to a map based upon the required electricity generation amount to determine the target air supply amount (S11). The target air supply amount corresponds to the amount of oxygen required according to the generated electricity amount. Next, the ECU 3 controls the air supply amount of the air supply unit 7 to the target air supply amount (S12).

The ECU 3 subsequently refers to a map based upon the required electricity generation amount to determine the target gas pressure of the air electrode (S13). Next, the ECU 3 controls the regulating valve 15 to control the gas pressure of the air electrode to the target gas pressure (S14).

The ECU 3 subsequently refers to a map based upon the required electricity generation amount to determine the target hydrogen partial pressure of the hydrogen electrode (S15). The target hydrogen partial pressure is an amount corresponding to the hydrogen concentration of the hydrogen electrode side required according to the generated electricity amount. Next, the ECU 3 calculates the target hydrogen pressure from the target gas pressure of the air electrode and the target hydrogen partial pressure of the hydrogen electrode (S17). In the embodiment, the target hydrogen pressure is set as the sum of the target gas pressure of the air electrode and the target hydrogen partial pressure.

The ECU 3 controls the hydrogen supply valve 13 to supply hydrogen of the target hydrogen pressure to the hydrogen electrode (S19). Such control results in the hydrogen partial pressure on the hydrogen electrode side being controlled to the target hydrogen partial pressure. The ECU 3 then returns the control to S11.

As described above, according to the fuel cell of the embodiment, the target hydrogen pressure is calculated based upon the gas pressure of the air electrode and the target hydrogen partial pressure for stable electricity generation during activation of the fuel cell. The supply pressure of hydrogen supplied to the hydrogen electrode is then controlled to the target hydrogen pressure. This in turn allows the hydrogen partial pressure of the hydrogen electrode to be substantially controlled to the target hydrogen partial pressure for stable electricity generation, and allows hydrogen required for stable activation to be supplied to the hydrogen electrode.

Thus in the fuel cell according to the embodiment, it is possible to control the hydrogen partial pressure, and therefore, the hydrogen concentration, on the hydrogen electrode side by controlling the hydrogen supply pressure during activation. Accordingly, there is no need to open the exhaust valve 17 during activation in order to discharge impurity gas within the hydrogen electrode, as in a conventional fuel cell. Therefore, even in cases where the exhaust valve 17 is frozen due to subzero temperatures, for example, the fuel cell can be activated in a short period of time.

In addition, according to the fuel cell of the embodiment, the gas pressure of the air electrode is controlled to the atmospheric pressure during activation. Oxygen among the air supplied to the air electrode is used in the reaction of the fuel cell, and impurities such as nitrogen pass through the diffusion layer and the electrolyte membrane to the hydrogen electrode side. Setting the air pressure to the atmospheric pressure makes it possible to reduce the partial pressure of impurity gas on the hydrogen electrode side, whereby the controlled target hydrogen pressure can be set low in practice, as compared to when pressure greater than the atmospheric pressure is added to the air electrode.

Furthermore, according to the fuel cell of the embodiment, during normal operation the target hydrogen pressure is calculated based upon the gas pressure of the air electrode and the target hydrogen partial pressure, according to the generated electricity amount, to supply hydrogen of the target hydrogen pressure. Due to such control, the fuel cell according to the embodiment supplies hydrogen with the target hydrogen partial pressure corresponding to the required electricity generation amount, that is, a target hydrogen concentration, to the hydrogen electrode. Accordingly, there is no need to open and close the exhaust valve 17 during normal operation in the fuel cell according to the embodiment. Therefore, it is possible to reduce a wasteful discharge of hydrogen caused by opening and closing of the exhaust valve 17. If the exhaust valve 17 becomes damaged, the activation and operation of the fuel cell can also be sustained according to the controls shown in FIGS. 3 and 4. Furthermore, the realization of such controls can also achieve a fuel cell whose structure omits the exhaust valve 17.

The above embodiment illustrates an example in which the air supply amount, the target gas pressure of the air electrode and the target hydrogen partial pressure are calculated from maps and the required electricity generation amount, whereby the hydrogen partial pressure of the hydrogen electrode is controlled by further calculating the target hydrogen pressure from the target gas pressure of the air electrode and the target hydrogen partial pressure. Such a hydrogen partial pressure may be corrected based upon a cell temperature of the fuel cell. The degree of activation of the catalyst within the cell differs depending on the cell temperature, because of changes in the required amount of hydrogen with respect to the required electricity generation amount, and therefore, the target hydrogen partial pressure. Here, the cell temperature is defined as the temperature of coolant that cools the cell of the fuel cell, and an example in which the hydrogen partial pressure is corrected based upon the coolant temperature will be illustrated hereafter.

Figure 5:
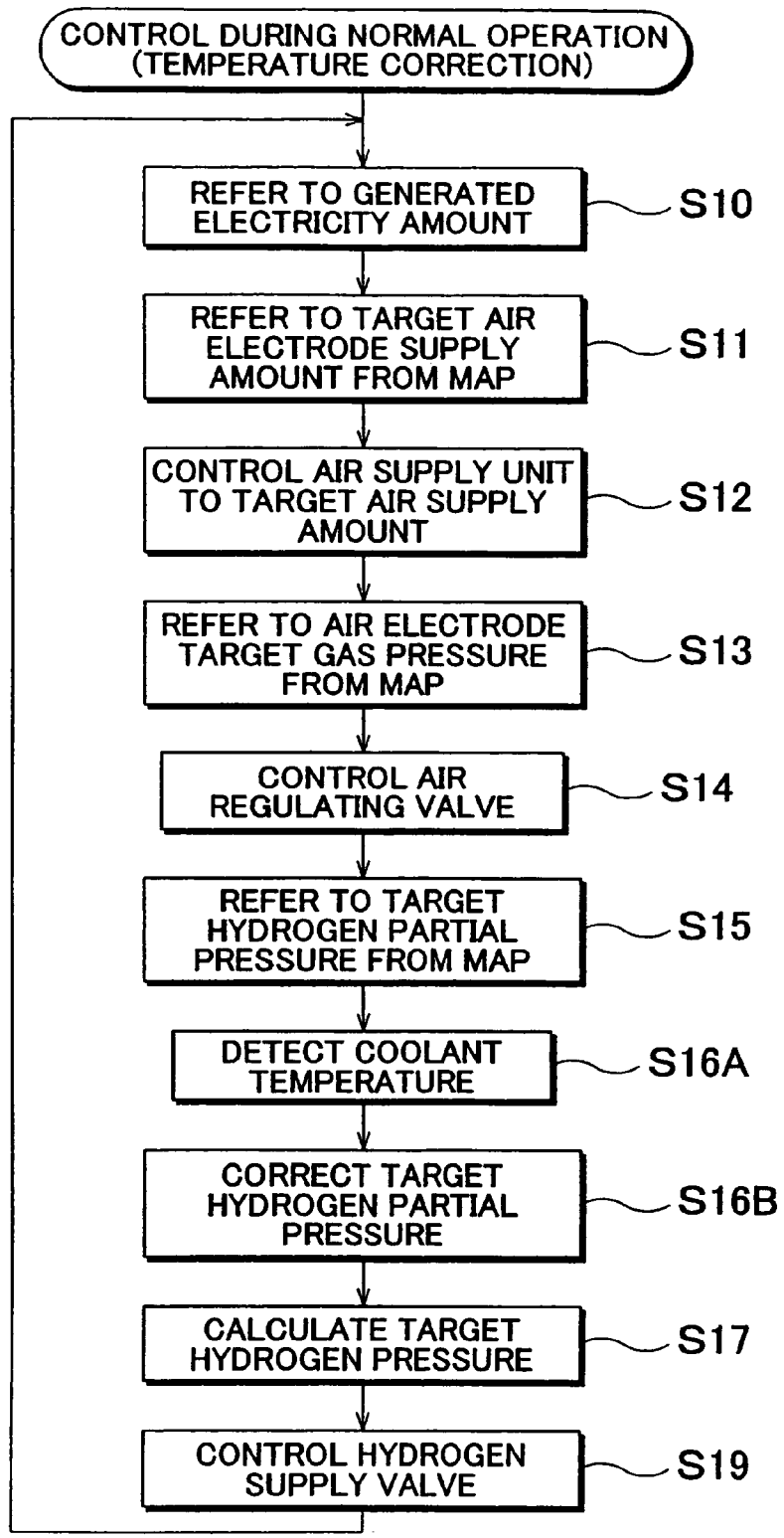
FIG. 5 is a flowchart illustrating a control for correcting a hydrogen partial pressure during normal operation using a coolant temperature of the fuel cell.

FIG. 5 illustrates an example of processing in which the target hydrogen partial pressure is corrected according to a temperature from the coolant temperature sensor 19, which measures the temperature of coolant. Processing steps in FIG. 5 comparable to those in the processing of FIG. 4 are represented by comparable reference numerals, and will not be described again.

In this processing, after determining the gas pressure of the air electrode and the target hydrogen partial pressure of the hydrogen electrode from the required electricity generation amount (S13-S15), the ECU 3 detects the temperature of coolant measured by the coolant temperature sensor 19 (S16A). Next, the ECU 3 refers to a map for correcting the target hydrogen partial pressure using the temperature of the coolant to correct the target hydrogen partial pressure (S16B).

Figure 6:
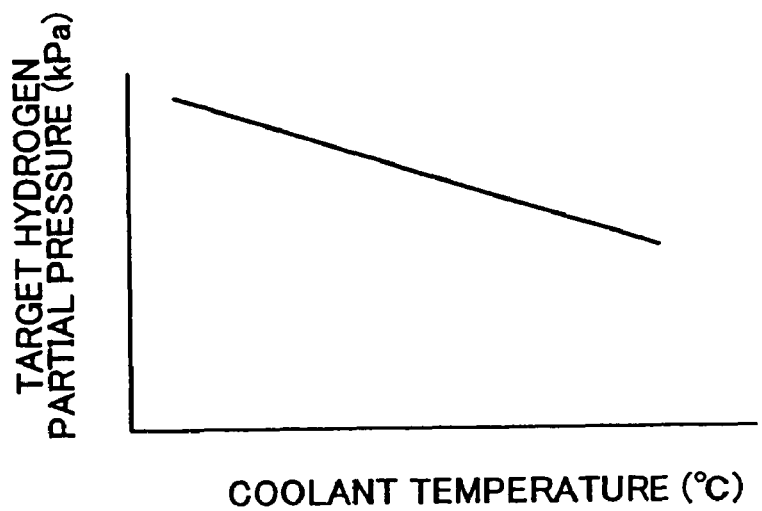
FIG. 6 is a conceptual diagram of a map in which the hydrogen partial pressure is corrected using the coolant temperature of the fuel cell.

FIG. 6 is a conceptual diagram of a map in which the target hydrogen partial pressure is corrected using the temperature of coolant in the fuel cell. As shown in FIG. 6, the x-axis of the map represents the coolant temperature, and the y-axis represents the target hydrogen partial pressure for meeting the required electricity generation amount at the coolant temperature. Similar to the map in FIG. 2, this map can also be retained in the memory of the ECU 3 in a table format and empirically based format.

Next, the ECU 3 calculates the target hydrogen pressure using the corrected target hydrogen partial pressure and the target gas pressure of the air electrode (S17). Subsequent processing is similar to that in FIG. 4.

Thus, according to the fuel cell of the modification, the target hydrogen partial pressure is corrected using the temperature of the coolant in the cell and the required electricity generation amount (the ECU 3 executing such processing corresponds to means for correcting the target hydrogen partial pressure). Accordingly, the target hydrogen partial pressure, and by extension, the target hydrogen pressure, can be calculated more precisely than with the processing of FIG. 4. Consequently, appropriate hydrogen can be supplied with respect to the required electricity generation amount, thereby lowering the risk of generating an excessive or insufficient amount of electricity.

It should be noted that although the cell temperature here is detected from the coolant temperature sensor 19, which measures the temperature of the coolant, a sensor that measures the cell temperature itself may be provided, and the cell temperature itself may be used to correct the target hydrogen partial pressure.

Figure 7:
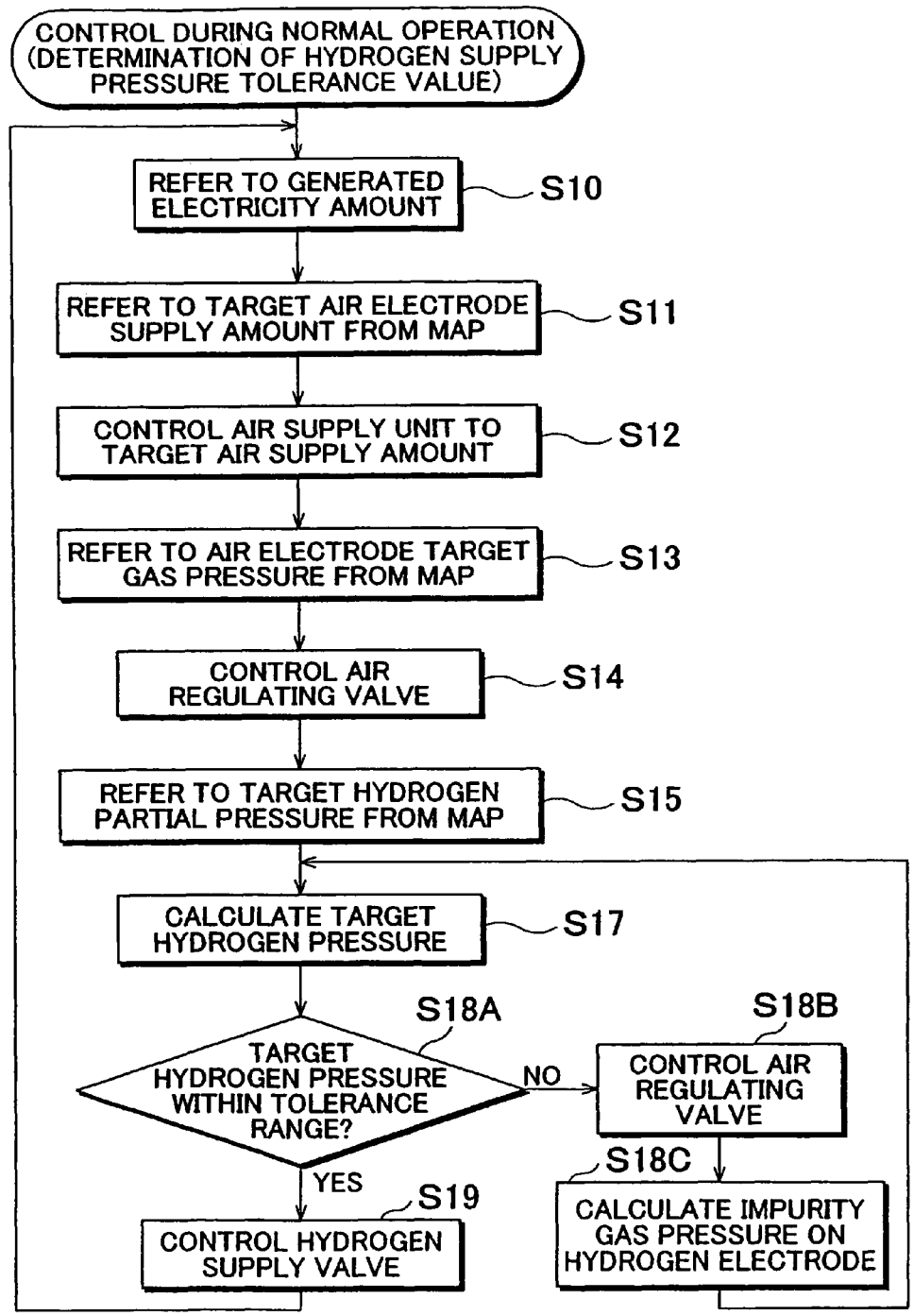
FIG. 7 is a flowchart illustrating a control of the ECU 3 for determining whether a hydrogen supply pressure during normal operation is in a tolerance range.

Next, a modification using the determination of a hydrogen pressure tolerance value will be described. FIG. 7 illustrates an example of processing in which a control sequence is changed, once the target hydrogen pressure is calculated, according to whether the target hydrogen pressure has exceeded a tolerance value. Such a tolerance value for the target hydrogen pressure can be determined, for example, as an actual value or a design value for preventing deterioration in the durability of the electrolyte membrane forming the cell. The ECU 3 may be configured to retain such a tolerance value in the memory.

Processing steps in FIG. 7 comparable to those in the processing of FIG. 4 are represented by comparable reference numerals, and will not be described again. in this processing, after calculating the target hydrogen pressure (S17), the ECU 3 determines whether the target hydrogen pressure is within a tolerance range (S18A).

If the target hydrogen pressure is not within the tolerance range, the ECU 3 controls the exhaust valve 17 to open the valve on the hydrogen electrode side, and also controls the hydrogen supply valve 13 to supply hydrogen to the hydrogen electrode and discharge residual gas within the hydrogen electrode (S18B). The ECU 3 executing such processing corresponds to exhaust control means. Accordingly, the partial pressure of impurity gas within the hydrogen electrode is lowered. The ECU 3 then calculates the partial pressure of impurity gas in the hydrogen electrode from an elapsed time since a previous opening of the exhaust valve 17, the generated electricity amount of the fuel cell, a current open-valve period, and the pressure of supplied hydrogen (S18C). The ECU 3 executing such processing corresponds to means for calculating the residual gas partial pressure. Thereafter, the ECU 3 returns the control to S15, and calculates the target hydrogen pressure based upon the pressure of impurity gas calculated in S18C. That is, in this case, the target hydrogen pressure may be set as the sum of the pressure of impurity gas in the hydrogen electrode and the target hydrogen partial pressure.

Alternatively, if it is determined in S16 that the target hydrogen pressure is within the tolerance range, the ECU 3 controls the hydrogen supply valve 13 such that the gas pressure of the hydrogen electrode becomes the target hydrogen pressure (S19). Subsequent processing is similar to that in FIG. 4.

As described above, according to the fuel cell of the embodiment, the exhaust valve 17 is opened if the target hydrogen pressure is not within the fuel cell tolerance range. In addition, hydrogen is supplied from the hydrogen supply valve 13 and impurity gas is discharged from the hydrogen electrode. Thus, the pressure of impurity gas within the hydrogen electrode is lowered, which in turn lowers the target hydrogen pressure.

Therefore, according to the fuel cell of the modification, it is possible to discharge impurities from the exhaust valve 17, without using the exhaust valve 17 in a normal state, only when the target hydrogen pressure is outside the tolerance range. The exhaust valve 17 is thus unnecessarily opened and closed less, thereby decreasing an excessive discharge of hydrogen. Furthermore, it is possible to avoid operation based upon a gas pressure on the hydrogen electrode side that is outside the tolerance range, by discharging impurity gas and lowering the target hydrogen pressure in the hydrogen electrode when the target hydrogen pressure is outside the tolerance range. This leads, for example, to increased durability of the electrolyte membrane, thereby lengthening its durable period (i.e., replacement cycle).

Other modifications will be described below. In the above embodiment, a fuel cell without a hydrogen circulation system such as shown in FIG. 1 was described, in which the target hydrogen pressure on the hydrogen electrode side is set to the sum of the impurity gas pressure and the target hydrogen partial pressure. However, embodiments of the invention are not limited to such a configuration. For example, a fuel cell with a hydrogen circulation system can be activated without opening and closing the exhaust valve 17 on the hydrogen electrode side by a control similar to that in FIG. 3. Furthermore, a fuel cell with a hydrogen circulation system can control the hydrogen concentration without opening and closing the exhaust valve 17 on the hydrogen electrode side by a control similar to that in FIG. 4.

The above embodiment illustrates an example in which oxidizing gas and air are supplied, with hydrogen supplied as a fuel gas. However, embodiments of the invention are not limited to such types of gas (that is, oxidizing gas and fuel gas). For example, oxygen may be used as an oxidizing gas, and natural gas may be used as a fuel gas.

In the above embodiment, the target hydrogen pressure is calculated from the target gas pressure of the air electrode and the target hydrogen partial pressure of the hydrogen electrode (refer to S17 in FIG. 4 for an example). However, embodiments of the invention are not limited to such a procedure. The effect of the partial pressure of gas in the air electrode and the partial pressure of gas in the hydrogen electrode (partial pressure of gas on both sides of the electrolyte membrane) on a permeation amount of gas passing from the air electrode side to the hydrogen electrode side can also be considered. Therefore, the hydrogen supply pressure may be corrected, for example, according to the partial pressure of impurity gas on an oxygen electrode side, whereby the hydrogen supply pressure may be lowered as the partial pressure of impurity gas (such as a partial pressure of nitrogen) on the oxygen electrode side decreases.

The invention claimed is:

1. A control method for a fuel cell comprising an oxidizing gas supplying unit configured to supply an oxidizing gas to a cathode via an oxidizing gas supply line of the fuel cell, and a hydrogen supplying unit configured to supply hydrogen to an anode via a hydrogen supply line of the fuel cell, the anode having a buildup of impurities over time causing a presence of residual gas, the method comprising:
   detecting a cathode-side gas pressure within at least one of the oxidizing gas supply line and the cathode with a pressure detecting device;
   dynamically calculating a target hydrogen partial pressure regarding a hydrogen pressure among a gas mixture in the anode, the dynamic calculation being based on the detected cathode-side gas pressure and a required electricity generation amount;
   setting a hydrogen supply pressure of hydrogen to be supplied to the fuel cell to a value that is calculated based on a value that is obtained by adding the calculated target hydrogen partial pressure to the detected cathode-side gas pressure; and
   controlling a hydrogen supply control device to regulate the supply of hydrogen from the hydrogen supplying unit to the fuel cell at the set hydrogen supply pressure.

2. The control method for a fuel cell according to claim 1, further comprising:
   detecting a temperature of the fuel cell with a temperature detecting device;
   correcting the calculated target hydrogen partial pressure based on the detected temperature of the fuel cell to yield a corrected target hydrogen partial pressure; and
   setting the hydrogen supply pressure of the hydrogen to be supplied to the fuel cell to a value that is calculated based on a value that is obtained by adding the corrected target hydrogen partial pressure to the detected cathode-side gas pressure.

3. The control method for a fuel cell according to claim 1, further comprising:
   discharging residual gas when the hydrogen supply pressure is not within a tolerance range for gas pressure on the anode side;
   calculating a partial pressure of the residual gas remaining within at least one of the anode and the hydrogen supply line when the residual gas is discharged; and
   setting the hydrogen supply pressure of the hydrogen to be supplied to the fuel cell to a value that is calculated based on a value that is obtained by adding the calculated target hydrogen partial pressure to the detected cathode-side gas pressure and the calculated residual gas partial pressure.

* * * * *